J S. CULP.
SPRING WHEEL.
APPLICATION FILED MAR. 9, 1914.

1,111,883.

Patented Sept. 29, 1914.
2 SHEETS—SHEET 1.

Witnesses
R. C. Barkley
Bessie Diener

Inventor
J Stanford Culp
By Louis C. Vanderslip
Attorney

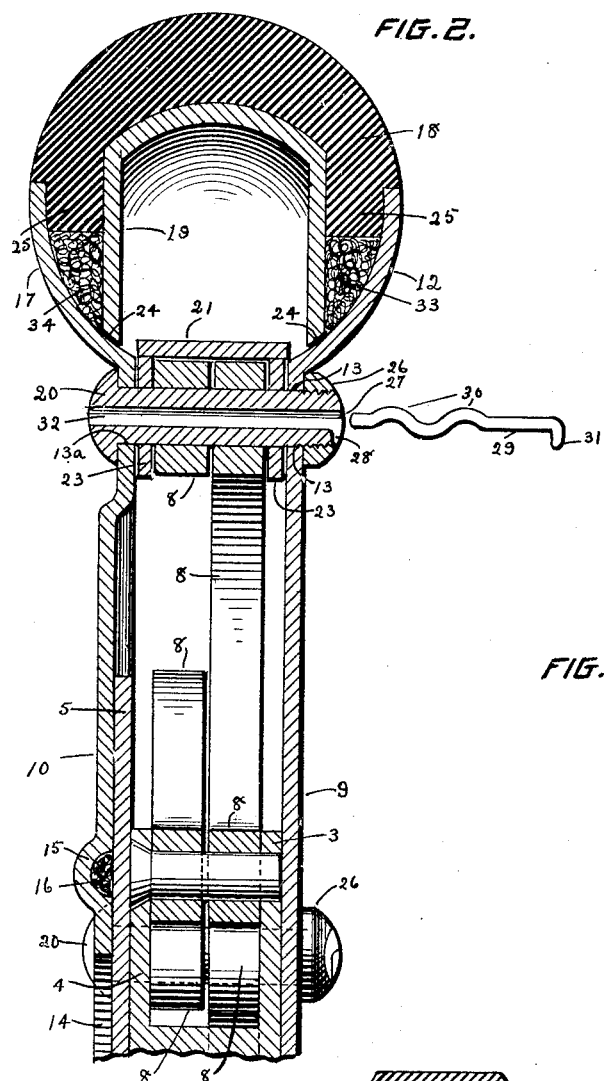
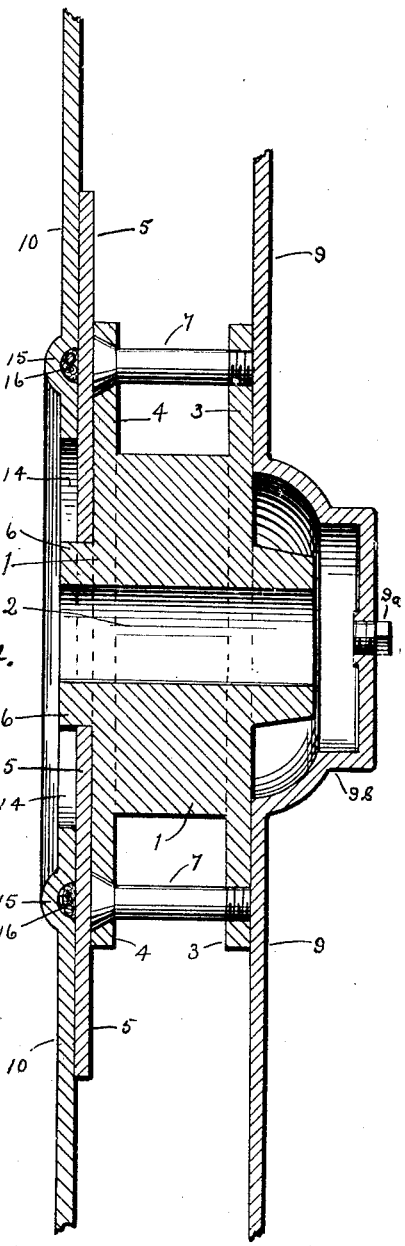
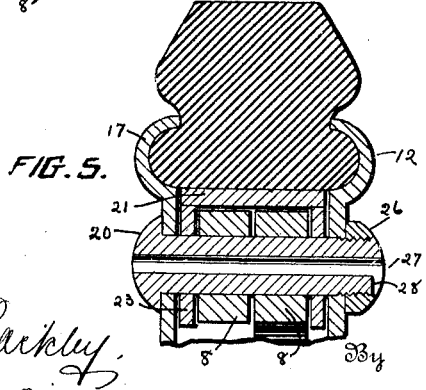

UNITED STATES PATENT OFFICE.

J STANFORD CULP, OF ELKHART, INDIANA.

SPRING-WHEEL.

1,111,883.  Specification of Letters Patent.  Patented Sept. 29, 1914.

Application filed March 9, 1914.   Serial No. 823,292.

*To all whom it may concern:*

Be it known that I, J STANFORD CULP, a citizen of the United States, residing at Elkhart, in the county of Elkhart and State of Indiana, have invented new and useful Improvements in Spring-Wheels, of which the following is a specification.

The invention relates to vehicle wheels but more particularly to the class of resilient, or spring wheels.

The objects of the invention are, first, to provide a spring wheel embodying a new and novel arrangement of curved, flat steel springs, second, to provide a special, new tire tread construction to permit of the use of a light, solid rubber tire resembling a pneumatic tire, and, third, to provide a simple and efficient spring wheel for general vehicle use. These objects are attained by the mechanism illustrated in the accompanying drawings, in which—

Figure 1:
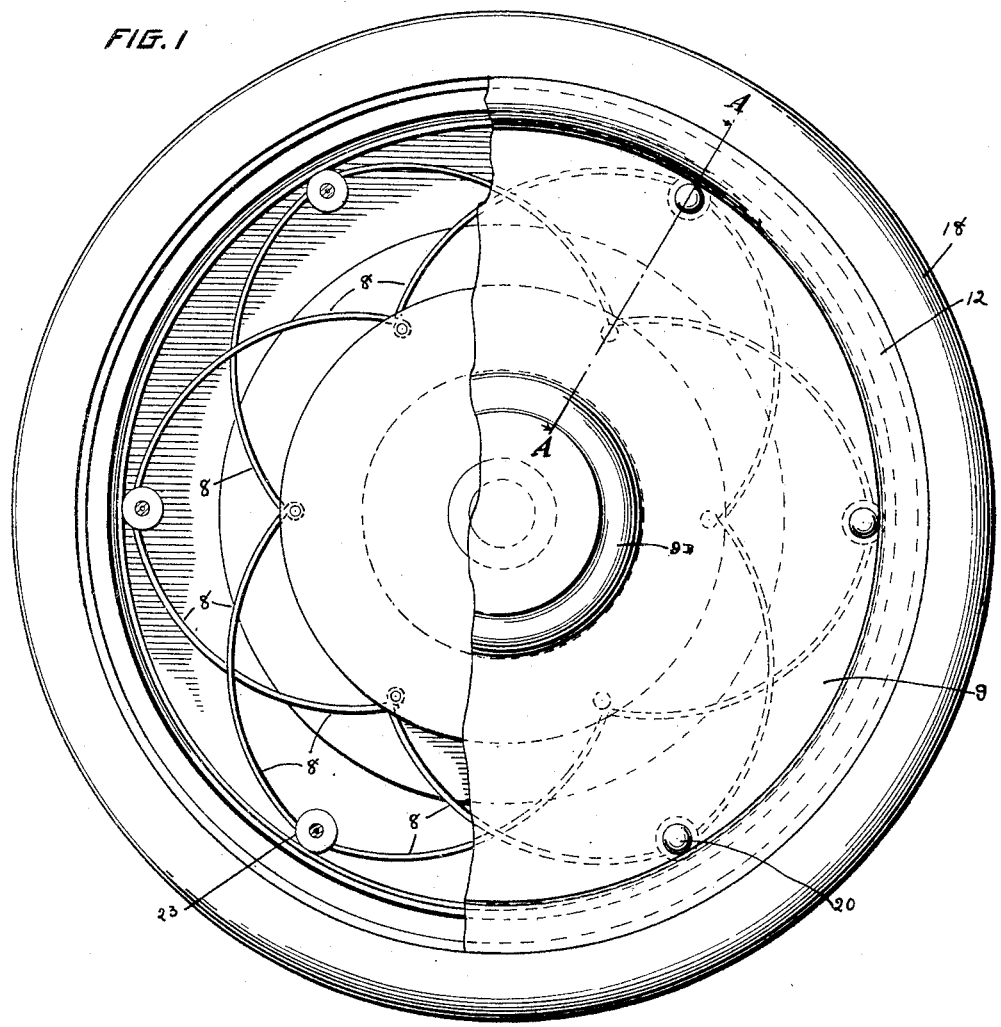
Figure 3:
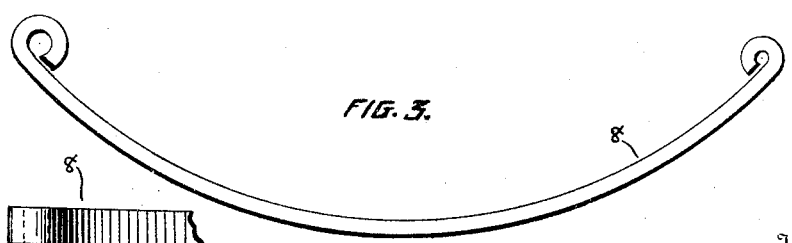

Figure 1 is a side elevation of the spring wheel showing the outer housing plate cut away exposing the interior of the wheel and the springs; Fig. 2 is a section through the wheel and tire on the line A—A of Fig. 1; Fig. 3 shows a view of the curved steel spring; Fig. 4 is an end elevation in section through the hub member and fragments of the housing plates; Fig. 5 shows a modified form of the invention.

Similar numerals refer to similar parts throughout the several views.

The hub member 1 is bored at 2 to receive an axle and is provided with radial flanges 3 and 4, separately disposed. The hub plate 5, which may be of larger diameter than hub flanges 3 and 4, and is annularly formed, fits tightly over and around hub extension 6 and closely against the side face of flange 4. Preferably, hub flange 5 is formed apart from hub member 1, but may be integral therewith.

A plurality of spring retainer bolts 7 are carried by the hub flanges 3 and 4, threaded at one end into flange 3 and having a countersunk head formed at the opposite end thereof. Each one of the bolts 7 carries the inner end of two curved springs 8, of which there is a plurality in the assembled wheel, and the bolt is encircled by an eye formed at the end of the spring 8.

An annular housing plate 9 is arranged on the outer side of said hub member 1, carries the false hub cap $9^B$ at its center and a plug $9^A$ for lubricant introduction. False hub cap $9^B$ is formed of sufficient size to permit of the free and wide movement of hub member 1, which is freely movable, when the wheel is subjected to loads or road shocks. Outer housing plate 9 carries also at its outer perimeter the flare portion 12 to clench a tire, and bolt holes 13.

An annular inner housing plate 10 is arranged opposite to plate 9 and carries an opening at its center portion to permit of the free and wide movement of the hub member extension 6, which opening is designated as 14 and may be formed in any suitable and practical manner. At a point close to the opening 14 and in inner housing plate 10 is formed an annular packing ring groove 15 for the reception of a packing ring 16, preferably formed of felt material, which ring 16 serves to exclude sand and other destructive material from, and to retain the lubricant within, the interior of the wheel by its close contact with the face of hub plate 5.

At the outer perimeter of inner housing plate 10 the flare section 17 is formed for disposition opposite to flare section 12 of the outer housing plate 9, for clenching a tire. Between the clencher members 12 and 17 of the housing plates 9 and 10 are arranged an annular rubber tire 18 and an annular metal tire tread 19 of channeled or U shaped formation to carry tire 18. Between tire tread 19 and the clamping bolts 20 is an annular spring tread band 21 on the inner surface of which the convex face of the flat springs 8 roll, or tread, when said springs 8 are subjected to compression from weight or road shocks. As the compression of springs 8 increases the tread of said convex surface thereof increases on the inner surface of said spring tread band 21, thereby shortening and stiffening the springs under compression and offering greater resistance to the load or road shock occasioning the compression of said spring 8. The clamping bolts 20 penetrate housing plate 9 through a plurality of holes 13, and housing plate 10 is also penetrated by bolt 20 through a plurality of holes $13^a$. Spacing washers 23 are carried and mounted upon bolt 20. The tire tread 19 has its inner edges 24 beveled to correspond with the angle of flare sections 12 and 17. When assembled, the lugs, or beads, 25 of the tire 18 are arranged between the side walls of tire tread 19 and flare sections 12 and 17 of the housing plates 9 and 10 in which position the tire beads 25 are securely clenched by the turning up of the nut 26 of the bolt 20. The nut 26 is formed with the slot 27 therein which shall aline with a slot 28 formed in the threaded end of the bolt 20. The bent locking pin 29 is formed with a plurality of bends 30 and a head 31 and is preferably made of tempered steel and hardened. The clamping bolt 20 is longitudinally drilled at 32 to receive the bent locking pin 29. To lock the nut 26 in position the locking pin 29 is arranged within bore 32 and the head 31 thereof is thrust into slot 27 of the nut 26 and slot 28 of the bolt 20. The spring bends 30 press outward and retain the locking pin 29 within bore 32.

The springs 8 are formed in a curved condition and have an eye at each end thereof, being made preferably of flat steel. The eye formed in spring 8 encircles bolt 7, the inner spring support, at the inner end thereof and between the radial hub flanges 3 and 4, while the eye at the outer end of spring 8 encircles the clamping bolt 20, otherwise known as the outer spring support. Each bolt 20 serves both as a clamping member and a spring support for the outer end of two of the springs 8 which converge thereon from relatively opposite directions and from separate inner spring supports 7. Each inner spring support 7 is encircled by an eye on the inner end of two of the springs 8 converging thereon from relatively opposite directions and from separate outer spring supports 20. Annular packing strips 33 and 34 are arranged within the clencher sections 12 and 17 to form a tight joint between the rubber tire 18 and the interior of the wheel.

I claim:

1. In a spring wheel, the combination comprising a hub member formed with radiated flanges, housing plates inclosing said hub member and in slidable engagement therewith, a plurality of spring supporting bolts arranged between said housing plates adjacent to the outer perimeters thereof, a plurality of curved springs arranged within said housing plates the outer ends of said springs being supported by said spring supporting bolts, the inner ends of said springs being secured to said hub flanges, each one of said spring supporting bolts being a support for the outer end of two of said springs which converge thereon from relatively opposite directions and from separate inner spring supports located in said hub flanges, and an annular spring tread band arranged between said housing plates adjacent the outer perimeters thereof, said spring tread band having an inner surface which serves as a support for said curved springs when said springs are under compression.

2. In a spring wheel, the combination comprising a hub member formed with radiated flanges, housing plates inclosing said hub member and in slidable engagement therewith, a plurality of spring supporting bolts arranged between said housing plates adjacent their outer perimeters and penetrating the same, a plurality of curved springs arranged within said housing plate the outer ends of said springs being supported by said spring supporting bolts, the inner ends of said springs being secured to said hub member, each one of said spring supporting bolts being a support for the outer end of a plurality of said springs which converge thereon from relatively opposite directions and from separate inner spring supports located in said hub member, an annular spring tread band arranged between said housing plates adjacent their outer perimeters, said spring tread band having an inner surface which serves as a support for said curved springs when the same are under compression, and means carried by one of the housing plates for excluding deleterious material from the interior of the wheel.

3. In a spring wheel, the combination comprising a hub member carrying radiated flanges, oppositely disposed housing plates inclosing said hub member and in slidable engagement therewith, a plurality of spring supporting bolts arranged between said housing plates adjacent their outer perimeters, a plurality of curved springs arranged within said housing plates the outer ends of said springs being supported by said spring supporting bolts, the inner ends of said springs being secured to said hub member, each one of said spring supporting bolts being a support for the outer end of a plurality of said springs which converge thereon from different directions and from separate inner spring supports located in said hub member, an annular spring tread band arranged between said housing plates adjacent said spring supporting bolts, and means carried by one of said housing plates for excluding deleterious material from the interior of the wheel.

4. In a spring wheel, the combination comprising a hub member carrying radiated flanges, oppositely disposed housing plates inclosing said hub member and in slidable engagement therewith, a plurality of spring supporting bolts arranged between said housing plates adjacent their outer perimeters and penetrating the same, a plurality of curved springs arranged within said housing plates the outer ends of the springs being supported by said spring supporting bolts and the inner ends thereof being mounted upon said hub member, an annular spring tread band arranged between said housing plates and adjacent said spring supporting bolts, said spring tread band having its inner surface adapted to serve as a support for said springs when the same are under compression.

In testimony whereof, I have hereunto set my hand this 5th day of March, A. D. 1914, in the presence of two subscribing witnesses.

J STANFORD CULP.

Witnesses:
HERMAN C. NEILSBERG,
EDWIN G. WALTER.

Copies of this patent may be obtained for five cents each, by addressing the "Commissioner of Patents, Washington, D. C."